P. W. Gates,

Shoes and Dies for Stamping Machines.

No. 2,115. Reissued Nov. 28, 1865.

Witnesses
R. T. Campbell
E. Schaefer

Inventor
P. W. Gates
by his Atty,
Mason, Fenwick & Lawrence

UNITED STATES PATENT OFFICE.

P. W. GATES, OF CHICAGO, ILLINOIS.

IMPROVED METHOD OF MAKING SHOES AND DIES FOR QUARTZ-STAMPERS.

Specification forming part of Letters Patent No. 29,372, dated July 31, 1860; Reissue No. 2,115, dated November 28, 1865.

*To all whom it may concern:*

Be it known that I, PHILETUS W. GATES, of Chicago, Cook county, State of Illinois, have invented a new Mode of Producing Shoes and Dies for Quartz-Stampers; and I do hereby declare that the following is a full, clear, and exact description thereof, reference being had to the accompanying drawings, making a part of this specification, in which—

Figure 1:
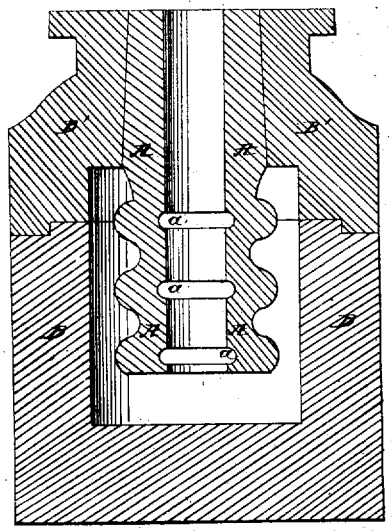
Figure 2:
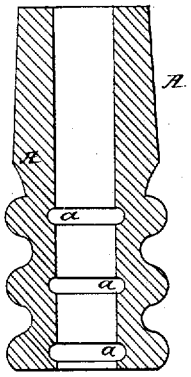
Figure 3:
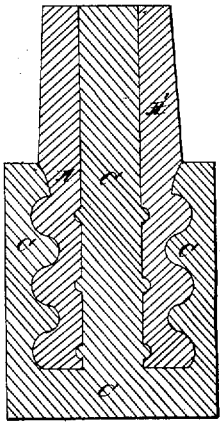
Figure 4:
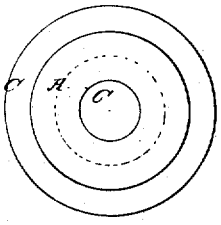
Figure 5:
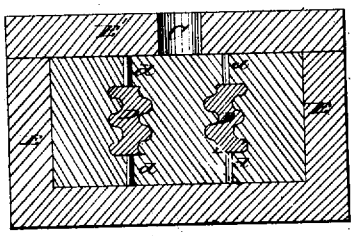
Figure 7:
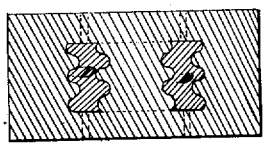
Figure 6:
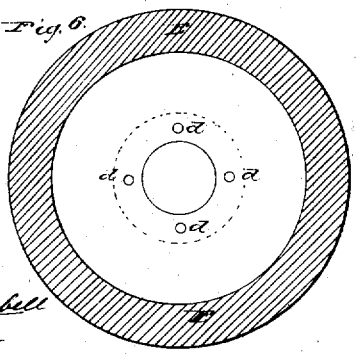

Figure 1 is a diametrical section through the flask and hollow stem arranged to receive the molten metal. Fig. 2 shows the hollow pin detached from the flask. Fig. 3 shows the shoe complete. Fig. 4 is a top view of the shoe. Figs. 5 and 6 represent in section the mode of casting the die. Fig. 7 is a diametrical section of the die when cast.

In the operation of machinery for breaking rock the acting faces of the stamp-heads, and also of the dies or anvils, soon wear out in consequence of the concussions to which these parts are subjected. One mode of rendering these surfaces more durable has been to employ chilled plates; but when the exterior surfaces of these plates wear out the difficulty incident to the soft metal again arises and the plates have to be removed and others substituted in their stead.

To obviate such objections, the object of my invention is to produce shoes and dies for stamping machinery of chilled cast metal in such manner that not only is the exterior surface of the shoe and that of the die chilled, but the entire body of the metal of these parts is chilled. Consequently hardened chilled surfaces will be constantly presented as said parts wear away.

Another objection to cast metal chilled shoes is this: Such shoes, as ordinarily made, very often crack or break off at the shoulder of the stem by which they are attached to the stamp-head, owing to the fact that the shoe and stem are cast or made of a corresponding hardness, and the stem, being of small diameter, is not able to withstand the heavy shocks to which it is subjected.

There is still another inconvenience experienced in the use of such machinery, which is this: With shoes and stamp-heads united as commonly, it is necessary to employ keys or pins for fastening the shoes to their heads, and owing to the heavy shocks, above referred to, these keys or pins soon work loose or are jarred out of place, and the parts separate when the stamp-heads are elevated.

The second part of my invention is designed to obviate the above-named difficulties; and said part of my invention consists in so constructing the shoe of cast metal that its body, including the inclosed portion of the stem, is chilled, while the projecting portion of said stem is sufficiently soft to prevent it cracking or breaking off when subjected to ordinary resistance in the operation of breaking quartz or other substances.

It also consists, in combination with the improvement last named, in making the projecting portion of the stems with a taper or conic form, the soft character and true surface which I am enabled to impart to the stems by turning off the metal rendering it practicable to form a firm connection between the stems and the heads, while the wedge or taper form of the stems insures a firm holding of the parts together, the effect of the resistance of the quartz to the descent of the stamps being to make the connection still firmer by reason of the taper stems entering still farther into the sockets of the stamp-heads, if the resistance is great enough to make any change in the relative position of the parts from that in which they are left when the shoe is driven home and the stamp is finished for sale or use.

To enable others skilled in the art to understand my invention, I will describe its construction and operation.

In the accompanying drawings, A represents a hollow stem, which is formed with its upper end tapering and the exterior surface of its lower portion serrated or corrugated, as shown in Figs. 1, 2, and 3. This hollow stem is formed in a true mold, and in coring it, to produce the opening through it, grooves or recesses *a a* are formed in it, as shown in Fig. 1. The tapering end of the stem A is of sufficient length to fit well into the stamp-head, so as to form an attachment thereto.

B B′ represent a two-part flask, B being the lower part, and B′ the upper part or neck, of the flask. The chamber in the part B is equal in diameter to that of the shoe when produced, and the opening through the center of the upper portion of the flask is adapted to receive the tapering portion of the stem A, as represented in Fig. 1, wherein it will be seen that the flask and stem are arranged to receive the molten metal. It is important to have the stem A exactly in the center of the shoe when formed, and for this purpose the two parts B B′ are formed very true, and put together by a rabbet-joint, and the whole held firmly in place while pouring and cooling the metal, which fills up the chambers in the flask and pin or stem.

In casting the shoe the molten metal is poured through the hollow stem A, and rises outside of this pin or stem in the flask, and fills up the space therein, completely enveloping the lower portion of the stem, and filling up the bore or opening through this stem, thus producing a shoe represented in section by Fig. 3, in which C represents the metal which was poured into the flask and its core-stem A.

It will be seen from the above description that as the hot metal comes in contact with the cold-metal flask B the outer surface of the shoe will be chilled or hardened, and simultaneously with this the hot metal will be chilled by the core-stem A, both inside and outside of this stem. Consequently the chilling operation will take place from circumference toward the center of the shoe, and from the center toward the circumference of the shoe, thereby chilling or hardening the body of the shoe throughout. The lower portion of the central stem, A, may be very thin, and instead of the corrugations and depressions on the inner and outer surfaces of this stem serrations may be made, or one or both surfaces may be roughened in any suitable manner, which will prevent the shell C from separating from the stem when the lower end of said shell is worn away and the lower end of the stem exposed. The stem A is formed with that portion of it which enters the body of the shoe chilled, so that when the lower end of the shoe is worn off and the end of the stem brought into action this stem will be as hard and durable as the metal which surrounds it. If the entire stem were soft, it would still present a chilling surface to that portion of the shoe represented by C in casting this metal, and thus enable me to chill from center to circumference, and vice versa; but if this stem should be entirely soft it would not be as durable when brought into action as the metal surrounding it; hence I prefer to chill the lower portion of the stem, and to cast this stem in such manner that it will be chilled throughout its lower part. The die or anvil (represented in Figs. 5, 6, and 7) is also chilled throughout by first forming a chilled ring, D, of a suitable diameter and width, and steadying this ring in a metal flask, E, as shown in Fig. 5, after which the molten metal is poured through a hole, *e*, through the cap E′ of the flask, and the ring completely surrounded by the metal. The office of the ring D is to chill the surrounding metal from center to circumference, while the metal flask chills from circumference to center. This ring also, like the stem A of the shoe, forms a central chilled core, so that as the anvil or die wears away a soft-metal surface will not be presented. I will here mention that the steadying-pins *d d*, which are used to establish the ring D in its proper position in the flask E, may be made of chilled metal, so that the entire face of the die will be uniformly hard.

I am aware that cast chilled-metal shoes have been made prior to my invention, also that the lower ends of solid stamp-heads have been chilled; but in the former instance, the stem and body of the shoe being of the same metal or metal of the same degree of hardness, the stem is too brittle to withstand the shocks to which it is subjected, while, on the other hand, if the shoe is made of soft metal to give strength to the stem, the surface of the shoe is too soft to be durable. Besides this, it is impossible, under the old modes of producing shoes for stamping machinery, to chill the metal throughout, and hence as soon as the hardened scale wears off the soft metal will be exposed.

By my invention I am enabled to harden the shoe throughout, and to afford a tapering soft-metal stem, by which to effect the attachment of the shoe to its stamp-head.

The junction of the two portions A and C of the shoe may be effected by means of corrugations or serrations on the stem A, or by making this stem so that it will vary in diameter in any suitable manner which will prevent the parts from separating when the end of the stem becomes exposed, in consequence of the wearing away of the lower end of the shell or case C.

While I have described the most preferable mode of casting the chilled shoes and dies, I do not desire to confine myself to the precise means employed, as the invention may be carried out by the adoption of other modes, substantially as herein described.

Having thus described my invention, what I claim as new, and desire to secure by Letters Patent, is—

1. Producing shoes and dies for quartz-crushing machinery by casting in a metal mold an outer case or shell of metal about a central chilled-metal core, substantially as described.

2. In the operation of casting shoes and dies for crushing machinery, using a central core of metal and an external flask or mold, for the purpose of producing a shoe or a die which is composed of more than one piece of metal, and which has its outer shell chilled in a direction from its center toward its circumference, as well as from its circumference toward its center, substantially as described.

3. A chilled cast-metal shoe constructed with a soft or unchilled attaching-stem, upon the lower chilled portion of which the shoe is cast, substantially in the manner and for the purpose described.

4. Making the projecting portion of the stem of a stamp-head shoe of taper form, and of unchilled metal, while the body of the shoe is chilled, the shoe being cast upon the lower chilled portion of the stem, substantially as and for the purpose described.

5. In the operation of casting a chilled shoe for stamping machinery, producing a chill upon the body of the shoe and inclosed portion of the stem, and leaving unchilled the projecting portion of the stem thereof, substantially as described, and for the purposes set forth.

P. W. GATES.

Witnesses:
SETH PAINE,
J. L. FARGO.